United States Patent [19]
Unruhe

[11] Patent Number: 5,883,840
[45] Date of Patent: Mar. 16, 1999

[54] MEMORY DEVICE AND METHOD FOR STORING DATA ACCORDING TO THE FIFO PRINCIPLE

[75] Inventor: Lorenz Unruhe, Bad Lippspringe, Germany

[73] Assignee: Siemens Nixdorf Informationssysteme AG, Paderborn, Germany

[21] Appl. No.: 12,592

[22] Filed: Jan. 23, 1998

[30] Foreign Application Priority Data

Feb. 5, 1997 [DE] Germany ............... 197 04 322.4

[51] Int. Cl.[6] .................................................. G11C 16/04
[52] U.S. Cl. ......................... 365/189.07; 365/189.04; 365/220; 365/221; 365/236
[58] Field of Search .................... 365/189.07, 220, 365/221, 236, 230.05, 189.04

[56] References Cited

U.S. PATENT DOCUMENTS

| | | | |
|---|---|---|---|
| 5,134,587 | 7/1992 | Steele | 365/201 |
| 5,289,408 | 2/1994 | Mimura et al. | 365/151 |
| 5,289,584 | 2/1994 | Thome et al. | 395/325 |
| 5,404,332 | 4/1995 | Sato et al. | 365/201 |
| 5,426,612 | 6/1995 | Ichige et al. | 365/220 |
| 5,491,659 | 2/1996 | Howarter et al. | 165/219 |
| 5,506,809 | 4/1996 | Csoppenszky et al. | 365/221 |

*Primary Examiner*—David Nelms
*Assistant Examiner*—Hien Hguyen
*Attorney, Agent, or Firm*—Hill & Simpson

[57] ABSTRACT

In a memory device for storing data according to the FIFO principle, an input counter is provided having a value which is modified when data are written into a memory, and having a comparison unit that outputs a status signal concerning presence of data in the memory dependent on a comparison of the counter states. A scanning unit is arranged at the connection between the comparison unit and the input counter. The scanning unit scans the state of the input counter according to a clock signal and outputs the scan result to the comparison unit.

12 Claims, 3 Drawing Sheets

MEMORY DEVICE AND METHOD FOR STORING DATA ACCORDING TO THE FIFO PRINCIPLE

BACKGROUND OF THE INVENTION

The invention relates to a memory device for storing data according to the FIFO principle (first in first out), having a memory, an input counter, an output counter and a comparison unit.

The data are preferably processed as data words with a predetermined number of bit positions. If a data word is written into the memory, the input counter is modified, and is preferably increased by the numeric value "1." In contrast, when a data word is read from the memory, the output counter is modified, e.g. likewise by an increase by the numeric value "1."

The comparison unit, which is connected at the input side with the output of the input counter and with the output of the output counter, compares the counter states of the input counter and the output counter and emits a status signal concerning the presence of data words in the memory.

In known FIFO memories (such as for example in the circuit SN74ACT7806), a complete decoupling of the asynchronous systems accessing the FIFO memory is not achieved. The status signal with the information about the number of data words contained in the FIFO memory is, as a rule, interrogated by the reading system. If the status signal changes during the interrogation as a result of a write access of the writing system, errors can occur in the reading system, because the status signal has what is known as a forbidden state during its interrogation, i.e. a physical state that is not unambiguously defined, to which no binary logical state corresponds.

SUMMARY OF THE INVENTION

An object of the invention is to provide a FIFO memory with a simple construction that enables an error-free coupling of the writing and the reading system.

According to the invention a scanning or sampling unit is arranged in the connection between the comparison unit and the input counter, the scanning unit scanning the state of the input counter according to a clock signal, and outputting the scan result to the comparison unit.

The invention proceeds from the consideration that from the point of view of the reading system, it is not possible to predict the precise time of a write access, so that it is constantly necessary to take into account that data words which also change the counter state of the input counter are being written into the FIFO memory. However, given a changing state of the input counter, a comparison just being carried out of the changing counter state with the counter state of the output counter will be defective.

For this reason, in the invention the state of the input counter is scanned using the scanning unit. Since this scanning takes place according to a clock signal that is known and is thus also predictable, it can be assumed that at least the scan result during the following comparison remains constant, so that the comparison is carried out correctly. A reliable operation of the FIFO memory thus results.

In an exemplary embodiment of the invention, the status signal is evaluated by an output unit dependent on the clock signal; thus, the writing system at the input side of the FIFO memory and the reading system at the output side of the FIFO memory are completely decoupled from one another with respect to the status signal. This means that it is ensured that this status signal remains at a constant value during the interrogation of the status signal. The consequence is that a stable status signal is supplied to the reading system, so that a reliable operation of the reading system is also ensured.

As a scanning unit, in the simplest case at least one flip-flop module is used. The number of flip-flop modules used is determined by the number of bit positions in the input counter. The flip-flop modules are clocked with the clock signal. However, since what are known as metastable states can occur in the flip-flop modules, particularly at high clock frequencies of the clock signal, it is useful to connect an additional flip-flop module behind the first flip-flop modules, the input of this additional flip-flop module being connected with the output of the first flip-flop module. The number of additional flip-flop modules is again determined by the number of bit positions in the input counter. The additional flip-flop modules are likewise clocked with the clock signal. By means of this arrangement, metastable states at the outputs of the additional flip-flop modules are excluded. There results a scanning unit of simple construction, which supplies a stable scan result.

The FIFO memory according to the invention or according to one of the exemplary embodiments of the invention is usefully used in an ASIC module (user-specific integrated circuit), because particularly high demands are made on the decoupling of input signals and output signals of the FIFO memory in such circuits. Standard clock frequencies in ASIC modules are e.g. 100 MHZ.

The invention also relates to a method for operating the FIFO memory, so that the technological effects cited in the explanation of the invention and its exemplary embodiments also hold for the method for operating the FIFO memory.

A further aspect of the invention relates to a FIFO memory wherein an input converter is provided having a value modified given a writing of data into the memory. The output counter has its value modified given the reading of data from the memory. A comparison unit is connected at the input side with the output of the input counter and with the output of the output counter, the comparison unit outputting a status signal concerning presence of data in the memory dependent on comparison of the counter states. The input counter and the output counter count at least to a value that corresponds to twice the number of memory cells in the memory, whereby only a part of the bit positions of the respective counter value is used for the addressing of the memory. In the known FIFO memories cited above, the counter states of the input counter and the output counter are subtracted from one another in a subtractor. Subsequently, the result of the subtraction is compared with predetermined values in a comparator, in order to produce one or several status signals. These predetermined values are e.g. the numeric value "0," a numeric value for half the memory capacity of the FIFO memory and a numeric value for the entire memory capacity of the FIFO memory.

In a further aspect of the invention, the input counter and the output counter count at least up to a value that corresponds to twice the number of the memory cells for the storing of input data, whereby the lowest bit positions of the respective counter value are used for the addressing of these memory cells. By means of this technique it is achieved that the comparison can be reduced to a checking of the inequality or equality of the counter states in the input counter and in the output counter. There results a FIFO memory of simple construction.

In the following, exemplary embodiments of the invention are explained with reference to the attached drawings.

DESCRIPTION OF THE PREFERRED EMBODIMENTS

Figure 1:
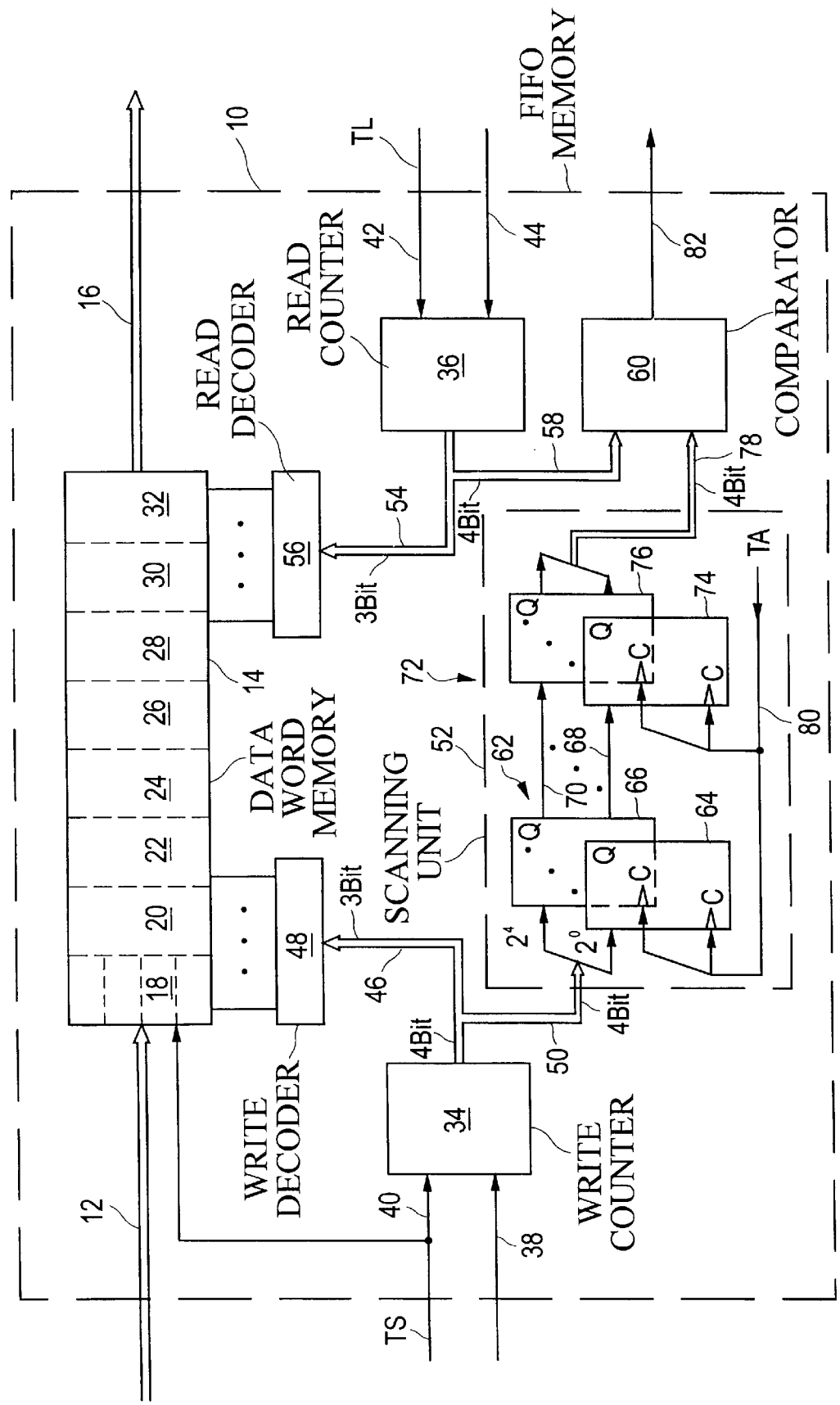
FIG. 1 shows a representation of the essential electrical functional units of a FIFO memory of the invention.

FIG. 1 shows essential electrical functional units of a FIFO memory 10 of the invention. Data words are written into a data word memory 14 via data lines 12. At the output of the data word memory 14, the data words are written in the same sequence as later output in writing to data lines 16. For the simplification of the following explanations, in this example the data word memory 14 contains only eight memory cells 18 to 32, in each of which one data word is stored. For the simple case of a data word width of four bit positions, each memory cell 18 to 32 thus contains four bit memory cells, which are indicated for the memory cell 18 by horizontal broken lines. Of course, in practice more memory cells and a greater data word width can be provided.

The FIFO memory 10 also contains a write counter 34 as an input counter for counting the write accesses and a read counter 36 as for an output counter counting the read accesses. The value of the write counter 34 is increased by the numeric value "1" as soon as a write signal is present on a write line 38, the write signal becoming effective with the rising pulse edge of a write clock signal TS on a clock line 40. Likewise, the read counter 36 is increased by the numeric value "1" according to a read pulse TL of a predetermined frequency on a clock line 42, if a read signal is present on a read line 44.

The write counter 34 is connected with a write decoder 48 via a line bus 46, the decoder addressing one of the memory cells 18 to 32 according to the counter state of the write counter 34. When the write signal occurs on the write line 38, the takeover of the input data on the data lines 12 into the memory cells 18 to 32, addressed by the write decoder 48, is effected synchronously with the write pulse TS by means of a controller (not shown). The write counter 34 counts cyclically from the numeric value "0" up to a counter value that corresponds to twice the number of memory cells 18 to 32 (in FIG. 1, up to the counter value "15"). However, on the line bus 46 only the least significant three bits of the counter state are transmitted from the write counter 34 to the write decoder 48, and are used for the addressing of the data word memory 14. The write counter 34 is also connected with a scanning unit 52 via a line bus 50. This line bus 50 contains one line more than the line bus 46, and transmits the complete counter state of the write counter 34 to a scanning unit 52 the construction of which is further described below.

The read counter 36 is connected with a read decoder 56 via a line bus 54 containing four lines, which decoder addresses one of the memory cells 18 to 32 dependent on the counter value of the read counter 36. When a read signal occurs on the read line 44, the data word in the memory cell 18 to 32 addressed by the read decoder 56 is output to the data lines 16. A line bus 58 connects the read counter 36 with a comparator 60, the functioning of which is likewise explained further below. This line bus 58 has one line more than the line bus 54. On the line bus 54, the bit positions $2^0$ to $2^3$ of the counter state are transmitted in the read counter 36, and on the line bus 58 the bit positions $2^0$ to $2^4$ of the counter state are transmitted in the read counter 36.

In a first flip-flop group 62, the scanning unit 5 contains four D flip-flops; of these, the flip-flops 64 and 66 are shown in FIG. 1. The flip-flops 64, 66 of the first flip-flop group 62 are respectively connected at the input side with a data line of the line bus 50. Thus, the value of the bit location $2^0$ is present at the input of the flip-flop 64, and the value of the bit location $2^4$ of the counter state of the write counter 34 is present at the input of the flip-flop 66. Outputs Q of the flip-flops 64, 66 of the first flip-flop group 62 are respectively connected with the inputs of flip-flops of a second flip-flop group 72 via lines 68 to 70. The flip-flop group 72 thus contains four D flip-flops; of these, the flip-flops 74 and 76 are shown in FIG. 1. The flip-flop 74 is connected with the flip-flop 64 via the line 68, and the flip-flop 76 is connected with the flip-flop 66 via the line 70.

The outputs Q of the flip-flops 74, 76 of the second flip-flop group 72 are connected to the comparator 60 via a line bus 78. All the flip-flops 64, 66, 74 and 76 of the scanning unit 52 are clocked by a common clock signal TA, which is for example identical with the read clock TL. The manner of operation of the scanning unit 52 is further explained below in relation to the example of the flip-flops 64 and 74, using FIG. 2.

The comparator 60 compares the counter states on the line bus 58 and the line bus 78 and produces a status signal at its output on a status signal line 82, which signal has the value "L" if the compared counter states are equal and has the value "H" if they are unequal. The status signal is interrogated by a reading circuit system (not shown) in order to check whether data words are present in the data word memory 14. The value "H" on the signal lines 82, in case of inequality of the compared counter states, signals that data words are present in the data word memory 14.

When binary counter states are increased, successive counter states result in which several bit positions change. By means of the use of synchronous write counters 34 and 36, it can be achieved, within certain limits, that all the bit positions of the counter values of the write counter 34 or of the read counter 36 change at approximately the same time, given an increase. However, given a comparison for inequality, an asynchronous write counter 34 or read counter 36 can also be used, since, given non-simultaneous change of the bit positions, it is at least recognized by the comparator 60 that a change has taken place that is signaled to the reading system via the status line 82. If the reading system then immediately reads a data word from the data word memory 14, and thus increases the counter state of the read counter 36, there elapses at least so much time that at least one additional pulse edge of the clock signal TA occurs, with which a counter state is then present at the comparator 60 in which all changing bit positions have the correct value.

The data lines 16, the clock lines 42, 80 and the read line 44 are also connected with the reading circuit system. On the other hand, a writing circuit system (not shown) is connected with the data lines 12, the clock line 40 and the write line 38. Data words can thus be transmitted from the writing circuit system to the reading circuit system via the FIFO memory 10. Although the two circuit systems operate asynchronously to one another, by means of the FIFO memory 10 a complete decoupling of the two circuit systems is achieved with respect to the status signal on the status signal line 82.

Figure 2:
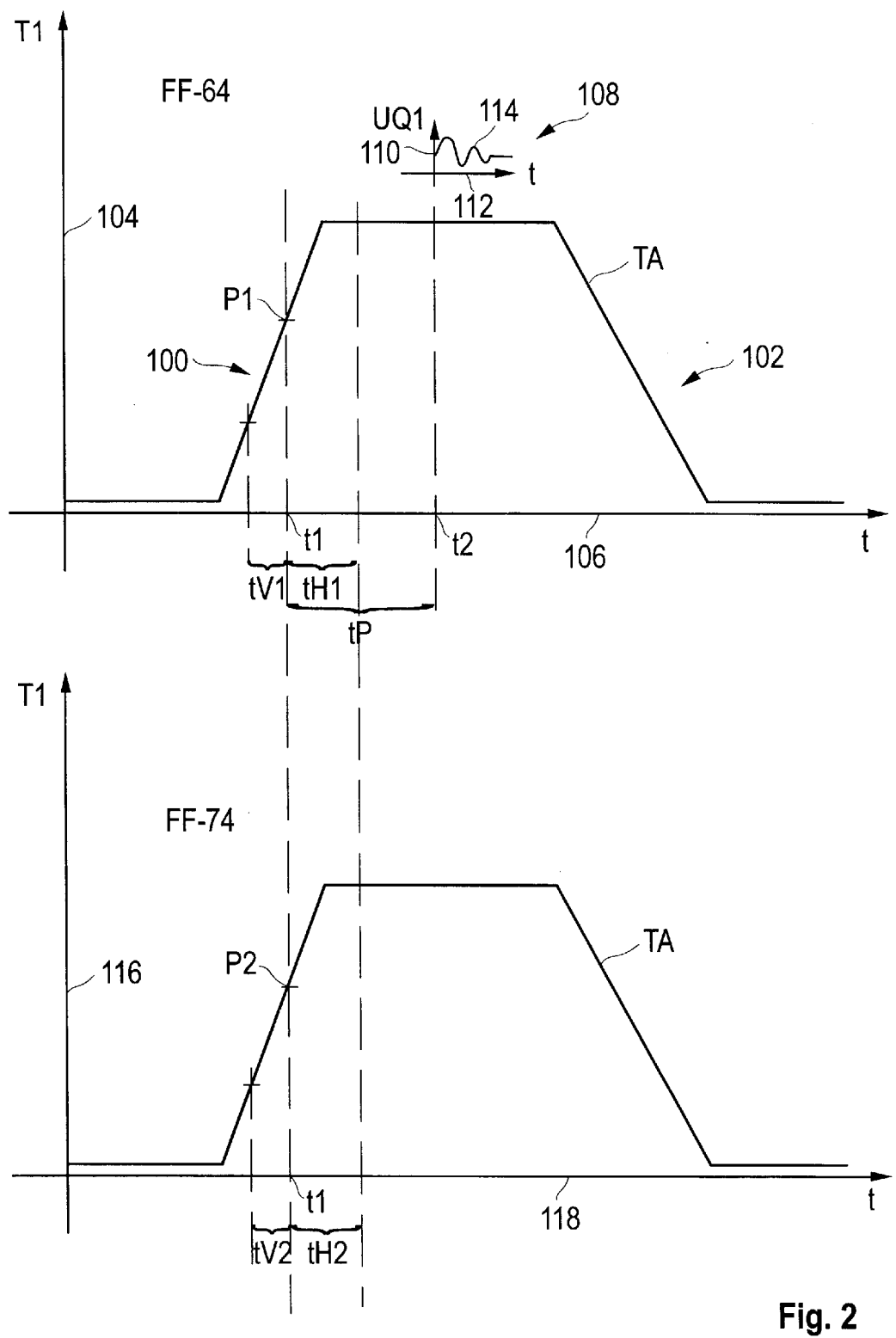
FIG. 2 shows signal curves at two D flip-flops connected in series.

FIG. 2 shows the manner of operation of the scanning unit 52 on the basis of two signal curves of the series-connected flip-flops 64 and 74 (cf. FIG. 1). In the upper part of FIG. 2, the switching times of the flip-flop 64 are shown. A point P1 in the upper third of the rising edge 100 of the clock signal TA on the clock line 80 serves as a reference point (cf. FIG. 1). For a better representation, the pulse edge 100 or a falling pulse edge 102 of the clock signal TA has a relatively small edge rise or edge fall. The instantaneous value TA of the clock signal TA on the clock line 80 is shown on the ordinate axis 104 of the upper representation in FIG. 2. The abscissa axis 106 forms the time axis.

The curve of the clock signal TA reaches the voltage belonging to the reference point P1 at a time t1. If input signals at the input of the flip-flop 64 are to be taken over with the clock signal TA, the input signals must already be present at the input of the flip-flop 64 (cf. FIG. 1) for what is known as a preparatory or lead time tV1 before time t1. In addition, the input signal must be present at the input in unchanged form for what is called the minimum hold time tH1. After a signal run time tP, the value of the input signal is then present at the output Q of the flip-flop 64. If fluctuations in the value of the input signal occur during the hold time tH1, then what are known as metastable states occur at the output after the expiration of the signal run time tP. Such a state is shown at the top in FIG. 2 in a coordinate system 108 that shows on its ordinate 110 the output voltage UQ1 at the output Q of the flip-flop 64. The time t is again plotted on the abscissa axis 112 of the coordinate system 108. If the signal run time tP has expired at a time t2 after the time t1, the metastable states are characterized in that signal oscillations 114 occur at the output of the flip-flop 64. The voltage value VQ1 at the output Q thus lies temporarily in forbidden regions between the signal value for "H" and "L."

In the lower part of FIG. 2, switching times at the flip-flop 74 (cf. FIG. 1) are shown with respect to the clock signal TA, which is also present at the clock input of the flip-flop 74. The instantaneous voltage value T1 of the clock signal TA is again plotted on the ordinate axis 116. The time t is plotted on the abscissa axis 118. With respect to the time ti, the flip-flop 74 also has a preparatory time tV2 that lies before the time t1. The preparatory time tV2 is the least time that an input signal must be present at the input of the flip-flop 74 before achieving the voltage of the clock signal TA belonging to a reference point P2. In order to avoid metastable states at the output Q of the flip-flop 74, the input signals must remain unaltered in their signal value at the input for a minimum hold time tH2. After the expiration of the minimum hold time tH2, changes in the input signal are without effect until the next clock impulse. The preparation time tV1 and the preparation time tV2 are approximately equal in length. The hold times tH1 and tH2 are likewise approximately equal in length.

By means of the connection in series of the flip-flops 64 and 74 (cf. FIG. 1), it is achieved that no metastable states can occur at the output Q of the flip-flop 74. This is due to the fact that oscillation states 114 that may occur have already decayed at the output of the flip-flop 64 and thus also at the input of the flip-flop 74, before input signals of the flip-flop 74, present during the preparation time tV2 and the hold time tH2, are switched effective at the output Q of the flip-flop 74. Thus, only one of the two permissible states "H" or "L" can occur at the output Q of the flip-flop 74. This holds true independently of the time at which the value of the write counter 34 (cf. FIG. 1) is increased.

Figure 3:
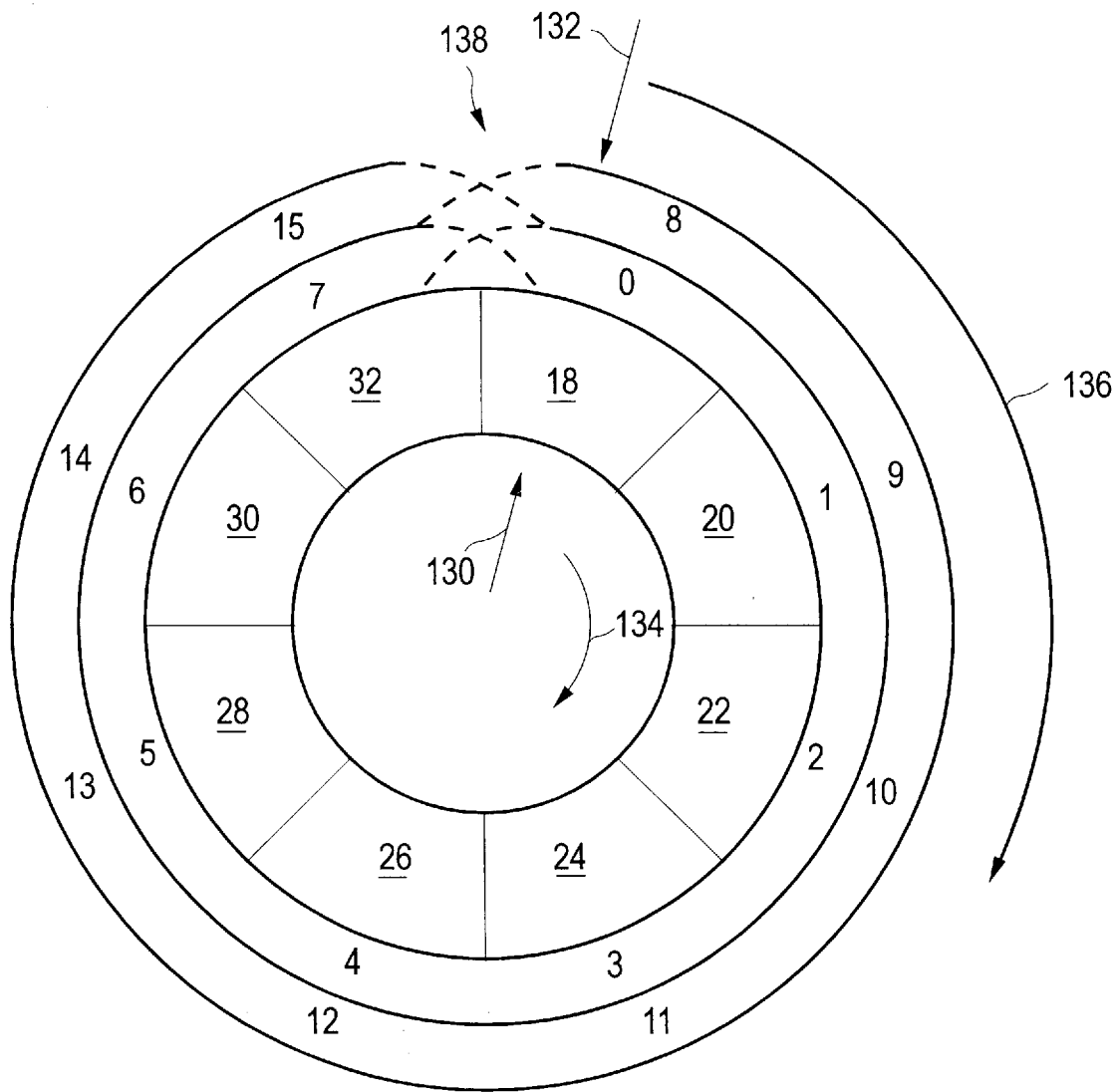
FIG. 3 shows a schematic view of the allocation of counter values to memory cells of the FIFO memory.

FIG. 3 shows a schematic view of the allocation of counter values "0" to "15" of the write counter 34 and of the read counter "36" to the memory cells 18 to 32 (cf. FIG. 1). After a resetting, the counter state of the write counter 34 (indicated by an arrow 130) or the counter state of the read counter 36 (indicated by an arrow 132), as shown in FIG. 3, has the numeric value "0". When the counter value of the write counter 34 is increased, the write arrow 130 moves clockwise (the direction of rotation is indicated by an arrow 134). In each read process, the read arrow 132 likewise moves ahead clockwise by one of the memory cells 18 to 32 (the direction of rotation is indicated by an arrow 136). Since, however, the most significant bit of the counter state of the read counter 34 or of the read counter 36 (cf. FIG. 1) is not used for the addressing of the memory cells 18 to 32, the following situation results at the twelve-o'clock position 138 of the write arrow 130 and of the read arrow 132: upon the transition from the counter value "7" to the counter value "8," a transition is made from the addressing of the memory cell 32 to the addressing of the first memory cell 18. On the other hand, upon the transition of the respective counter value from the numeric value "15" to the numeric value "0," a transition is made from the addressing of the memory cell 32 to the addressing of the first memory cell 18.

The effect of this addressing with a crossover 138 of the counter states in the twelve-o'clock position is that e.g. the state "memory cells 18 to 32 written" can be distinguished from the state "memory cells 18 to 32 empty" by means of a simple comparison of the counter values of the write counter 34 and the read counter 36. If after resetting there occur for example eight write accesses, one immediately after the other, the write arrow 130 rotates 360° in the clockwise direction, cf. arrow 134, so that it again reaches the position shown in FIG. 3. Although the write arrow 130 and 132 point to the same memory cell 18, it can be recognized on the basis of the counter states "8" or "0" that eight values were stored in the memory cells 18 to 32. With the use of counter values "0" to "7," this is not possible without problems.

Although various minor changes and modifications might be proposed by those skilled in the art, it will be understood that my wish is to include within the claims of the patent warranted hereon all such changes and modifications as reasonably come within my contribution to the art.

I claim as my invention:

1. A memory device for storing data according to a FIFO principle, comprising:

a data word memory;

an input counter, a value of which is modified when data are written into the data word memory;

an output counter, a value of which is modified when data are read from the data word memory;

a comparison unit connected at a first input with an output of the input counter and at a second input with an output of the output counter, said comparison unit, dependent on a comparison of counter states of the input and output counters, outputting a status signal concerning presence of data in the data word memory; and a scanning unit providing said connection between said first input of the comparison unit and the output of the input counter, said scanning unit scanning the counter state of the input counter according to a clock signal and outputting a scan result to said comparison unit.

2. The memory device according to claim 1 wherein the input counter comprises a write counter which connects to the data word memory through a write decoder, and said output counter comprises a read counter which connects to said data word memory through a read decoder.

3. The memory device according to claim 1 wherein said status signal is present at at least one output unit for evaluating the status signal dependent on a clock signal, said at least one output unit being connected with a read line of said memory device via which said data word memory signals a read-out process dependent on said clock signal.

4. The memory device according to claim 1 wherein said scanning unit comprises at least one first flip-flop module having a clock input to which a clock signal is applied.

5. The memory device according to claim 4 wherein said scanning unit comprises at least one additional second flip-flop module connected at an input side with an output of said first flip-flop module and having a clock input at which said clock signal is provided.

6. The memory device according to claim 1 wherein a write clock applied to said input counter and to said data word memory permits writing of data to said data word memory and wherein a read clock applied to said output counter permits reading of said data word memory and wherein said write clock and said read clock are phase-displaced relative to one another.

7. The memory device according to claim 6 wherein the read clock and write clock have different clock frequencies.

8. The memory device according to claim 1 wherein said input counter and said output counter count at least up to a value that corresponds to twice a number of memory cells in said data word memory, only a part of bit positions of respective counter values of said input and output counters being employed for addressing of the data word memory.

9. The memory device according to claim 1 wherein at least some of the components of said memory device are provided in a single ASIC module.

10. A memory device for storing data according to a FIFO principle, comprising:

a data word memory having data lines for input of data words and output data lines for output of data words;

a write counter connected to said data word memory via a read decoder, a value of the read counter being modified when data are written into the data word memory;

a read counter connected to said data word memory via a read decoder, a value of the read counter being modified when data are read from the data word memory;

a comparison unit connected at a first input via a scanning unit with an output of the write counter and at a second input with an output of the read counter, said comparison unit, dependent on a comparison of counter states of the write and read counters, outputting a status signal concerning presence of data in the data word memory; and said scanning unit scanning the counter state of the read counter according to a clock signal and outputting a scan result to said comparison unit.

11. A method for operating a FIFO memory, comprising the steps of:

providing a data word memory having an input counter and an output counter connected thereto;

modifying a value of said input counter given writing of data into said data word memory;

modifying a value of said output counter given a reading of data from said data word memory;

providing a comparator and producing a status signal by a comparison of said value of said output counter with said value of said input counter, said status signal indicating presence of data in said data word memory; and with a scanning unit, scanning said value of said input counter according to a clock signal, and using said value of said output counter in said comparison.

12. A memory device for storing data according to a FIFO principle comprising:

a data word memory having an input counter and an output counter connected thereto, a value of said input counter being modified giving writing of data into said data word memory, and a value of said output counter being modified given reading of data from said data word memory;

a comparison unit connected at a first input with an output of said input counter and at a second input with an output of said output counter, said comparison unit outputting a status signal concerning presence of data in said data word memory dependent on comparison of counter states of said input and output counters; and the input counter and the output counter counting at least to a value that corresponds to twice a number of memory cells in said data word memory, only a part of bit positions of respective counter values of the input counter and output counter being used for addressing of the data word memory.

* * * * *